(12) United States Patent
Gundert et al.

(10) Patent No.: US 8,728,970 B2
(45) Date of Patent: May 20, 2014

(54) CATALYST COMPONENT FOR THE POLYMERIZATION OF OLEFINS

(75) Inventors: Friedhelm Gundert, Liederbach (DE); Martin Schneider, Hochheim (DE); Joachim Berthold, Grassau (DE); Bernd Lothar Marczinke, Römerberg (DE)

(73) Assignee: Basell Polyolefine GmbH, Wesseling (DE)

(*) Notice: Subject to any disclaimer, the term of this patent is extended or adjusted under 35 U.S.C. 154(b) by 0 days.

(21) Appl. No.: 13/387,102

(22) PCT Filed: Aug. 2, 2010

(86) PCT No.: PCT/EP2010/061210
§ 371 (c)(1), (2), (4) Date: Feb. 21, 2012

(87) PCT Pub. No.: WO2011/015552
PCT Pub. Date: Feb. 10, 2011

(65) Prior Publication Data
US 2012/0142873 A1 Jun. 7, 2012

Related U.S. Application Data

(60) Provisional application No. 61/274,145, filed on Aug. 13, 2009.

(30) Foreign Application Priority Data

Aug. 6, 2009 (EP) .................................... 09167320

(51) Int. Cl.
*B01J 31/00* (2006.01)
*C08F 4/44* (2006.01)
*C08F 110/02* (2006.01)
*B01J 37/00* (2006.01)

(52) U.S. Cl.
USPC ......... 502/103; 526/123.1; 526/352; 502/132

(58) Field of Classification Search
None
See application file for complete search history.

(56) References Cited

U.S. PATENT DOCUMENTS

| 4,447,587 A | 5/1984 | Berthold et al. |
| 5,648,309 A * | 7/1997 | Bohm .......................... 502/105 |
| 2011/0077367 A1 * | 3/2011 | Gundert et al. ............ 526/123.1 |

FOREIGN PATENT DOCUMENTS

| CN | 101120025 | 2/2008 | |
| WO | WO 2006/078170 | 8/2006 | |
| WO | WO 2008061662 A1 * | 5/2008 | .............. C08F 10/02 |

OTHER PUBLICATIONS

Chinese Office Action Mailed Jan. 14, 2013—Corresponding Application No. 201080035834.6.

* cited by examiner

*Primary Examiner* — David W Wu
*Assistant Examiner* — Elizabeth Eng

(57) ABSTRACT

A solid catalyst component comprising the product of a process comprising (a) reacting a magnesium alcoholate of formula $Mg(OR_1)(OR_2)$ compound, in which $R_1$ and $R_2$ are identical or different and are each an alkyl radical having 1 to 10 carbon atoms, with titanium tetrachloride carried out in a hydrocarbon at a temperature of 50-100° C., (b) subjecting the reaction mixture obtained in (a) to a heat treatment at a temperature of 110° C. to 200° C. for a time ranging from 3 to 25 hours (c) isolating and washing with a hydrocarbon the solid obtained in (b), said solid catalyst component having a Cl/Ti molar ratio higher than 2.5.

10 Claims, No Drawings

CATALYST COMPONENT FOR THE POLYMERIZATION OF OLEFINS

This application is the U.S. national phase of International Application PCT/EP2010/061210, filed Aug. 2, 2010, claiming priority to European Application 09167320.2 filed Aug. 6, 2009 and the benefit under 35 U.S.C. 119(e) of U.S. Provisional Application No. 61/274,145, filed Aug. 13, 2009; the disclosures of International Application PCT/EP2010/061210, European Application 09167320.2 and U.S. Provisional Application No. 61/274,145, each as filed, are incorporated herein by reference.

The present invention relates to a catalyst component for the polymerization of olefins, in particular ethylene and its mixtures with olefins $CH_2=CHR$, wherein R is an alkyl, cycloalkyl or aryl radical having 1-12 carbon atoms, comprising a solid catalyst component comprising Ti, Mg, halogen having specified molar ratio and being obtained by a specific preparation process.

Furthermore, the present invention relates to a process for preparing ethylene homopolymers and copolymers characterized by a high melt flow rate ratio ($FRR_{21.6/5}$) value, which is the ratio between the melt index measured with a 21.6 Kg load and the melt index measured with a 5 Kg load, determined at 190° C. according to ISO1133. Said ratio $FRR_{21.6/5}$ is generally considered as an indication of the width of molecular weight distribution.

The MWD is a particularly important characteristic for ethylene (co) polymers, in that it affects both the rheological behavior and therefore the processability of the melt, and the final mechanical properties. Polyolefins having a broad MWD, particularly coupled with relatively high average molecular weight, are preferred in high speed extrusion processing and in blow molding, conditions in which a narrow MWD could cause melt fracture and higher shrinkage/warpage.

Catalyst systems capable to produce ethylene polymers with broad molecular weight distribution are described in U.S. Pat. No. 4,447,587. The catalyst is obtained by reacting magnesium alcoholates with titanium tetrachloride at a relatively low temperature and by subjecting the so obtained reaction mixture to a long heat treatment at a fairly high temperature in order to split off alkyl chlorides.

The magnesium alcoholates are reacted typically with a molar excess of $TiCl_4$ at a temperature ranging from 50 to 100° C. and then subject to a heat treatment carried out at temperature ranging from 110° C. to 200° C. for a time span said to be in the range from 10 to 100, hours but concretely in the examples being at least 45 hours, with evolution of alkyl chloride until no further alkyl chloride is split off. After filtering and washing the solid obtained shows a composition in which the Cl/Ti atomic ratio is lower than 3 and most typically in the range 2.6-2.8.

In the preferred embodiment the catalyst component is preactivated with triisobutylaluminum (TIBA) before ethylene (co)polymerization in suspension which is carried out with additional aluminum trialkyl compound, (triisobutyl aluminum or triisoprenyl aluminum). The so obtained catalyst is able to offer broad molecular weight distribution but the polymerization activity is not sufficient.

The polymerization activity is a very important factor in any polymerization process. For a given catalyst system, it may depends on the polymerization conditions, such as temperature, pressure and molecular weight regulator concentration. However, once fixed the polymerization conditions, the activity depends strictly on the catalyst system and when the activity is not satisfactory the amount of catalyst fed to the reactor must be increased or its residence time made longer. In any case, it is clear that the above solution penalizes the plant operability from the economic point of view as the increase of catalyst fed means increase of the cost per unity of polymer produced, while the increase of the residence time means a lower productivity of the plant.

In view of this importance, the need of increasing the catalyst activity is always felt. The Ziegler-Natta catalyst are generally obtained by reacting an aluminum alkyl compound with a solid catalyst component comprising a magnesium halide and a titanium compound containing at least a Ti-halogen bond. As the catalyst component is responsible for both the activity and the polymer properties, once the catalyst system has been chosen for industrial production it is changed for a different one having higher activity, only if the new one maintains basically unaltered the polymer properties. This is the reason why it is needed to modify the catalyst activity of a certain catalyst system without changing its capability to produce a polymer with certain properties.

It has been surprisingly found that modifications of the recipe described in U.S. Pat. No. 4,447,587 are able to produce a new catalyst component having a different composition and showing a much higher activity.

It is therefore an object of the present invention a solid catalyst component comprising the product of a process comprising (a) reacting a magnesium alcoholate of formula $Mg(OR_1)(OR_2)$ compound, in which $R_1$ and $R_2$ are identical or different and are each an alkyl radical having 1 to 10 carbon atoms, with titanium tetrachloride carried out in a hydrocarbon at a temperature of 50-100° C., (b) subjecting the reaction mixture obtained in (a) to a heat treatment at a temperature of 110° C. to 200° C. for a time ranging from 3 to 25 hours (c) isolating and washing with a hydrocarbon the solid obtained in (b), said solid catalyst component having a Cl/Ti molar ratio higher than 2.5.

In the preparation of the catalyst component (A), $R_1$ and $R_2$ are preferably alkyl groups having from 2 to 10 carbon atoms or a radical $—(CH_2)_nOR_3$, where $R_3$ is a $C_1$-$C_4$-alkyl radical and n is an integer from 2 to 6. Preferably $R_1$ and $R_2$ are $C_1$-$C_2$-alkyl radical. Examples of such magnesium alkoxides are: magnesium dimethoxide, magnesium diethoxide, magnesium di-1-propoxide, magnesium di-n-propoxide, magnesium di-n-butoxide, magnesium methoxide ethoxide, magnesium ethoxide n-propoxide, magnesium di(2-methyl-1-pentoxide), magnesium di(2-methyl-1-hexoxide), magnesium di(2-methyl-1-heptoxide), magnesium di(2-ethyl-1-pentoxide), magnesium di(2-ethyl-1-hexoxide), magnesium di(2-ethyl-1-heptoxide), magnesium di(2-propyl-1-heptoxide), magnesium di(2-methoxy-1-ethoxide), magnesium di(3-methoxy-1-propoxide), magnesium di(4-methoxy-1-butoxide), magnesium di(6-methoxy-1-hexoxide), magnesium di(2-ethoxy-1-ethoxide), magnesium di(3-ethoxy-1-propoxide), magnesium di(4-ethoxy-1-butoxide), magnesium di(6-ethoxy-1-hexoxide), magnesium dipentoxide, magnesium dihexoxide. Preference is given to using the simple magnesium alkoxides such as magnesium diethoxide, magnesium di-n-propoxide and magnesium di-isobutoxide. Magnesium diethoxide is especially preferred.

The magnesium alkoxide can be used as a suspension or as a gel dispersion in a hydrocarbon medium. Use of the magnesium alkoxide as a gel dispersion constitutes a preferred embodiment. In general, commercially available magnesium alkoxides, in particular $Mg(OC_2H_5)_2$, has average particle diameter ranging from 200 to 1200 µm preferably about 500 to 700 µM. In order to have optimal results in the catalyst preparation it is preferable to substantially reduce its particle size. In order to do so, the magnesium alcoholate is suspended in an inert, saturated hydrocarbon thereby creating a hydrocarbon suspension. The suspension can be subject to high shear stress conditions by means of a high-speed disperser (for example Ultra-Turrax or Dispax, IKA-Maschinenbau Janke & Kunkel GmbH) working under inert atmosphere (Ar or N2). Preferably the shear stress is applied until a gel-like dispersion is obtained. This dispersion differs from a standard suspension in that it is substantially more viscous than the suspension and is gel-like. Compared with the suspended magnesium alcoholate, the dispersed magnesium alcoholate gel settles down much more slowly and to a far lesser extent.

As already explained, in the first step, the magnesium alkoxide is reacted with $TiCl_4$ in an inert medium.

The reaction of the magnesium alkoxide with $TiCl_4$ is carried out at a molar ratio of Ti/Mg higher than 1 and preferably in the range 1.5 to 4, and more preferably in the range of 1.75 to 2.75, at a temperature from 50 to 100° C., preferably from 60 to 90° C. The reaction time in the first stage is 0.5 to 8 hours, preferably 2 to 6 hours.

The hydrocarbon used as inert suspension media for the abovementioned reactions include aliphatic and cycloaliphatic hydrocarbons such as butane, pentane, hexane, heptane, cyclohexane, isooctane and also aromatic hydrocarbons such as benzene and xylene. Petroleum spirit and hydrogenated diesel oil fractions which have carefully been freed of oxygen, sulfur compounds and moisture can also be used.

In a successive step (b) the so obtained reaction mixture containing the product of the reaction between the magnesium alcoholate and the transition metal compound is subject to a thermal treatment at a temperature ranging from 80° C. to 160° C., preferably from 100° C. to 140° C., for a period of time ranging from 3 to 25 hours, preferably from 5 to 15 hours before split-off process of alkyl chloride is complete. At the end of the preparation process particle size of the catalyst component (A) preferably ranges from 5 to 30 μm and more preferably from 7 to 15 μm.

After step (b) is completed, hydrocarbon washings at temperatures ranging from 60 to 80° C. can be carried out until the supernatant mother liquor has Cl and Ti concentrations of less than 10 mmol/l. As explained, the solid obtained at the end of the washing step (c) has a Cl/Ti molar ratio of at least 2.5, preferably at least 3 and more preferably ranging from 3 to 5. The solid obtained has the following typical composition: Mg:Ti:Cl=1:(0.8-1.5):(3.2-4.2).

In certain cases, it has been proven to be useful to carry out a further stage (d), in which the obtained solid is contacted with an aluminum alkyl halide compound in order to obtain a final solid catalyst component in which the Cl/Ti molar ratio is increased with respect to that of the solid before step (d).

The alkylaluminum chloride is preferably selected from the dialkylaluminum monochlorides of the formula $R^3_2AlCl$ or the alkylaluminum sesquichlorides of the formula $R^3_3Al_2Cl_3$ in which $R^3$ can be identical or different alkyl radicals having 1 to 16 carbon atoms. The following may be mentioned as examples: $(C_2H_5)_2AlCl$, $(isobutyl)_2AlCl$ and $(C_2H_5)_3Al_2Cl_3$, (ethylaluminum sesquichloride), this latter being preferred. The reaction can be carried out in a stirred vessel at a temperature of from 0° C. to 150° C., preferably from 30° C. to 100° C. for a time ranging from 0.5 to 5 hours.

The aluminum alkylchloride compound is used in amounts such that the Al/Ti molar ratio (calculated with reference to the Ti content of the solid catalyst component as obtained by the previous step) is from 0.05 to 1, preferably from 0.1 to 0.5.

As explained, this latter reaction generates a final solid catalyst component in which the Cl/Ti molar ratio is increased and generally being at least 3 most preferably higher than 3.5.

By effect of this latter step (d) a certain extent of the titanium atoms may be reduced from oxidation state $Ti^{+4}$ to oxidation state $Ti^{+III}$.

The so obtained catalyst component is used together with an organo aluminum compound (B) in the ethylene polymerization.

The organoaluminum compound (B) is preferably selected from the trialkyl aluminum compounds such as for example trimethylaluminum (TMA), triethylaluminum (TEAL), tri-isobutylaluminum (TIBA), tri-n-butylaluminum, tri-n-octylaluminum, triisoprenylaluminum. Also alkylaluminum halides and in particular alkylaluminum chlorides such as diethylaluminum chloride (DEAC), diisobutylaluminum chloride, Al-sesquichloride and dimethylaluminum chloride (DMAC) can be used in mixture with said trialuminum alkyls. Use of TEAL and TIBA is preferred.

It is also preferred firstly to prepolymerize the preactivated catalyst system with alpha-olefins, preferably linear C2-C10-1-alkenes and in particular ethylene or propylene, and then to use the resulting prepolymerized catalyst solid in the main polymerization. The mass ratio of catalyst solid used in the prepolymerization to monomer polymerized onto it is usually in the range from 1:0.1 to 1:20.

The catalysts systems of the invention are particularly suited for liquid phase polymerization process. In fact, the small average particle size, such as less than 30 μm, preferably ranging from/7 to 15 μm, is particularly suited for slurry polymerization in an inert medium, which can be carried out continuously in stirred tank reactors or in loop reactors. In a preferred embodiment the ethylene polymerization process is carried out in two or more cascade loop or stirred tank reactors producing polymers with different molecular weight and/or different composition in each reactor, thereby showing, as a whole, a broad distribution of molecular weight and/or monomer composition. As explained, the catalysts of the invention are able to produce in higher yield with respect to the catalyst disclosed in U.S. Pat. No. 4,447,587, ethylene polymers having broad molecular weight distribution and suitable for use in the blow molding application field.

In addition, to the ethylene homo and copolymers mentioned above the catalysts of the present invention are also suitable for preparing very-low-density and ultra-low-density polyethylenes (VLDPE and ULDPE, having a density lower than 0.920 g/cm³, to 0.880 g/cm³) consisting of copolymers of ethylene with one or more alpha-olefins having from 3 to 12 carbon atoms, having a mole content of units derived from ethylene of higher than 80%; elastomeric copolymers of ethylene and propylene and elastomeric terpolymers of ethylene and propylene with smaller proportions of a diene having a content by weight of units derived from ethylene of between about 30 and 70%.

The following examples are given in order to further describe the present invention in a non-limiting manner.

EXAMPLES

The results for the elemental composition of the catalysts described reported in the examples were obtained by the following analytical methods:

Ti: photometrically via the peroxide complex

Mg, Cl: titrimetrically by customary methods $MFR_{5/190}$: mass flow rate (melt index) in accordance with ISO1133, nominal load of 5 kg and test temperature=190° C.

$FRR_{21.6/5}$: flow rate ratio; quotient of $MFR_{21.6/190}$ and $MFR_{5/190}$

Bulk density: in accordance with DIN EN ISO 60

$d_{50}$ (mean particle diameter): in accordance with DIN 53477 and DIN66144

$M_w/M_n$ (polydispersity): Measure of the width of the molar mass distribution ($M_w$=weight average, $M_n$=number average), determined by the GPC method in accordance with DIN55672. The measurements were carried out at 135° C. using trichlorobenzene as solvent.

Example 1

According to the Invention a) Preparation of the Catalyst Component A:

A suspension of 4.0 kg (=35 mol) of commercial available $Mg(OC2H5)_2$ in 25 dm³ of diesel oil having a boiling range from 140 to 170° C. (hydrogenated petroleum fraction) have been treated in a high speed disperser (Krupp Supraton™ type S200) at 60° C. for a period of 16 hours thus forming a gel-like dispersion. This $Mg(OC2H5)_2$-dispersion was transferred to a 130 dm³ reactor equipped with an impeller stirrer and baffles and which already contained 19 dm³ of diesel oil. After rinsing with 5 dm³ of diesel oil 7.6 dm³ (=70 mol) of $TiCl_4$, diluted to 10 dm³ with diesel oil, were then added at 70° C. over a period of 6 hours at a stirring speed of 80 rpm. Afterwards the mixture was heated at T=120° C. for 5 hours. 50 dm³ of diesel oil having a boiling range from 140 to 170° C. (hydrogenated petroleum fraction) were then added and the mixture was cooled to T=65° C. After the solid had settled, the supernatant liquid phase (mother liquor) was then decanted off to a residual volume of 50 dm³. 50 dm³ of fresh diesel oil (hydrogenated petroleum fraction having a boiling range from 140 to 170° C.) were subsequently introduced. After a stirring time of 20 minutes and a sedimentation period of ca. 90 minutes the supernatant liquid was again decanted off to a residual volume of 50 dm³. This washing procedure was repeated until the titanium concentration of the mother liquor was less than 10 mmol/dm³.

The suspension was then cooled to room temperature. The titanium content was 0.25 gcatalyst/mmolTi and the molar ratio of the solid (catalyst component A) was:

Mg:Ti:Cl≈1:0.84:3.18.

b) Ethylene Polymerization in Suspension:

The polymerization experiments were carried out batch-wise in a 200 dm³ reactor. This reactor was equipped with an impeller stirrer and baffles. The temperature in the reactor was measured and automatically kept constant. The polymerization temperature was 85±1° C.

The polymerization reaction was carried out in the following way:

100 dm³ of diesel oil (hydrogenated petroleum fraction having a boiling range from 140 to 170° C.) were placed in the N2-blanketed reactor and heated to 85° C. Under a blanket of inert gas (N2), 100 mmol of triethylaluminum diluted to 200 cm³ with diesel oil were added as cocatalyst (=catalyst component B) and the catalyst component A prepared as described under a) was subsequently introduced into the reactor in an amount corresponding to 8.0 mmol of titanium (=2.0 gcatalyst) as a suspension diluted with diesel oil. The molar aluminum/titanium ratio was thus 12.5:1.

The reactor was pressurized a number of times with $H_2$ (hydrogen) to 8 bar and depressurized again to remove the nitrogen completely from the reactor (the procedure was monitored by measurement of the $H_2$ concentration in the gas space of the reactor, which finally indicated 95% by volume). The polymerization was started by opening the ethylene inlet. Ethylene was introduced in an amount of 8.0 kg/h over the entire polymerization time, with the pressure in the reactor rising slowly. The concentration of hydrogen in the gas space of the reactor was measured continually and the proportion by volume was kept constant by introducing appropriate amounts of hydrogen (% by volume of $H_2$ about. 55).

The polymerization was stopped after 225 minutes (total of 30 kg of ethylene gas fed in). For quantification of catalyst productivity the specific mileage is determined as follows:

Specific mileage=kg polyethylene/(g catalyst*bar$_{ethylene}$*polymerization-time in hours).

The results of the polymerizations are shown in Table 1.

Example 2

According to the Invention

Example 2 was performed in the same way as described in example 1) with the exception that the mixture was heated for 7.5 hours at 120° C.

The titanium content was 0.22 gcatalyst/mmolTi and the molar ratio of the solid (catalyst component A) was:

Mg:Ti:Cl≈1:1.06:3.36.

The polymerization was carried out as described in Example 1, except that 50 mmol of triethylaluminum as cocatalyst (catalyst component B) and subsequently the catalyst component A prepared as described in Example 2 in an amount corresponding to 3 mmol of titanium (=0.66 g catalyst), as a suspension diluted with diesel oil, were introduced into the reactor. The molar aluminum/titanium ratio was thus 16.7:1. The results of the polymerizations are listed in Table 1.

Example 3

According to the Invention

Catalyst component A as described in example 2 was pre-activated with Aluminium-sesquichloride (EASC). The molar Al/Ti-ratio was 0.25:1. The reaction was performed at 85° C. for a time-period of 2 hours.

The titanium content was 0.27 gcatalyst/mmolTi and the molar ratio of the solid (catalyst component A) was:

Mg:Ti:Cl≈1:1.01:3.96.

The polymerization was carried out as described in Example 1, except that 56 mmol of triethylaluminum as cocatalyst (catalyst component B) and subsequently the catalyst component A prepared as described in Example 3 in an amount corresponding to 4.5 mmol of titanium (1.2 g catalyst), as a suspension diluted with diesel oil, were introduced into the reactor. The molar aluminum/titanium ratio was thus 12.5:1. The results of the polymerizations are listed in Table 1.

Example 4

According to the Invention

Preactivated catalyst component A as described in example 3 was prepolymerised with ethylene. While stirring, the reactor was flushed three times with 2 bar of hydrogen and then pressurized with 3 bar of hydrogen. At 65° C. ethylene was subsequently metered in at a rate of 0.5 to 1.0 kWh. After 3 hours the prepolymerisation was stopped and the suspension was cooled down. After the solid had settled, the supernatant liquid phase (mother liquor) was then decanted off to a residual volume of 50 dm³. 50 dm³ of fresh diesel oil (hydrogenated petroleum fraction having a boiling range from 140 to 170° C.) were subsequently introduced. After a stirring time of 20 minutes and a sedimentation period of ca. 90 minutes the supernatant liquid was again decanted off to a residual volume of 50 dm³. This washing procedure was repeated until the chlorine concentration of the mother liquor was less than 10 mmol/dm³. The titanium content was 0.38 gcatalyst/mmolTi The polymerization was carried out as described in Example 1, except that 50 mmol of triethylaluminum as cocatalyst (catalyst component B) and subsequently the catalyst component A prepared as described in Example 4 in an amount corresponding to 4.7 mmol of titanium (=1.8 g catalyst), as a suspension diluted with diesel oil, were introduced into the reactor. The molar aluminum/titanium ratio was thus 10.6:1. The results of the polymerizations are listed in Table 1.

Example 5

According to the Invention

Example 5 was performed in the same way as described in example 1) with the exception that the mixture was heated for 10 hours at 120° C.

The titanium content was 0.20 gcatalyst/mmolTi and the molar ratio of the solid (catalyst component A) was:

Mg:Ti:Cl≈1:1.22:3.93.

The polymerization was carried out as described in Example 1, except that 125 mmol of triethylaluminum as cocatalyst (catalyst component B) and subsequently the catalyst component A prepared as described in Example 5 in an amount corresponding to 10.0 mmol of titanium (2.0 g catalyst), as a suspension diluted with diesel oil, were introduced into the reactor. The molar aluminum/titanium ratio was thus 12.5:1. The results of the polymerizations are listed in Table 1.

Example 6

According to the Invention

Example 6 was performed in the same way as described in example 1) with the exception that the mixture was heated for 12 hours at 120° C. The titanium content was 0.22 gcatalyst/mmolTi and the molar ratio of the solid (catalyst component A) was:

Mg:Ti:Cl≈1:1.34:3.81.

The polymerization was carried out as described in Example 1, except that 187 mmol of triethylaluminum as cocatalyst (catalyst component B) and subsequently the catalyst component A prepared as described in Example 6 in an amount corresponding to 15 mmol of titanium (3.3 g catalyst), as a suspension diluted with diesel oil, were introduced into the reactor. The molar aluminum/titanium ratio was thus 12.5:1.

Example 7

According to the Invention

Catalyst component A as described in example 6 was pre-activated with Aluminium-sesquichloride (EASC). The molar Al/Ti-ratio was 0.25:1. The reaction was performed at 85° C. for a time-period of 2 hours.

The titanium content was 0.22 gcatalyst/mmolTi and the molar ratio of the solid (catalyst component A) was:

Mg:Ti:Cl≈1:1.40:4.38.

The polymerization was carried out as described in Example 1, except that 125 mmol of triethylaluminum as cocatalyst (=catalyst component B) and subsequently the pre-activated catalyst component A prepared as described in Example 7 in an amount corresponding to 10 mmol of titanium (2.2 g catalyst), as a suspension diluted with diesel oil, were introduced into the reactor. The molar aluminum/titanium ratio was thus 12.5:1. The results of the polymerizations are listed in Table 1.

Example 8

According to the Invention

Example 8 was performed in the same way as described in example 1) with the exception that the mixture was heated for 25 hours at 120° C.

The titanium content was 0.19 gcatalyst/mmolTi and the molar ratio of the solid (catalyst component A) was:

Mg:Ti:Cl≈1:1.19:3.27.

The polymerization was carried out as described in Example 1, except that 187 mmol of triethylaluminum as cocatalyst (=catalyst component B) and subsequently the catalyst component A prepared as described in Example 2 in an amount corresponding to 15 mmol of titanium (2.9 g catalyst), as a suspension diluted with diesel oil, were introduced into the reactor. The molar aluminum/titanium ratio was thus 12.5:1.

Comparative Example 1

Comparative example 1 was performed in the same way as described in example 1) with the exception that 4.5 kg (=39.4 mol) of Mg(OC7H5)2 and that 11 dm³ (98.4 mol) of TiCl4 were used and in addition with the exception that the mixture was heated only for 1 hour at 120° C. The titanium content was 1.05 gcatalyst/mmolTi and the molar ratio of the solid (catalyst component A) was:

Mg:Ti:Cl≈1:0.16:2.34.

The polymerization was carried out as described in Example 1, except that 50 mmol of triethylaluminum as cocatalyst (=catalyst component B) and subsequently the catalyst component A prepared as described in comparative example 1 in an amount corresponding to 3 mmol of titanium (=3.15 g catalyst), as a suspension diluted with diesel oil, were introduced into the reactor. The molar aluminum/titanium ratio was thus 16.7:1. The results of the polymerizations are listed in Table 1.

Comparative Example 2

Comparative example 2 was performed in the same way as described in example 1) with the exception that the mixture was heated for 50 hours at 120° C. The titanium content was 0.17 gcatalyst/mmolTi and the molar ratio of the solid (catalyst component A) was:

Mg:Ti:Cl≈1:1.44:3.49.

The polymerization was carried out as described in Example 1, except that 187 mmol of triethylaluminum as cocatalyst (catalyst component B) and subsequently the catalyst component A prepared as described in comparative example 2 in an amount corresponding to 15 mmol of titanium (2.6 g catalyst), as a suspension diluted with diesel oil, were introduced into the reactor. The molar aluminum/titanium ratio was thus 12.5:1. The results of the polymerizations are listed in Table 1.

TABLE 1

| Example | specific mileage kgPE/ ($g_{cat}*P_{C2}*h$) | $MFR_{5/190}$ g/10 min | $FRR_{21.6/5}$ 21.6/5 | $M_w/M_n$ | Bulk density g/dm$^3$ | $d_{50}$ µm |
|---------|---------|---------|---------|---------|---------|---------|
| 1  | 2.48 | 15.7 | 12.5 | 11.3 | 332 | 181 |
| 2  | 2.57 | 13.4 | 11.5 | 9.0  | 326 | 290 |
| 3  | 2.35 | 9.2  | 12.3 | 9.3  | 350 | 242 |
| 4  | 1.84 | 5.7  | 12.6 | 10.6 | 272 | 300 |
| 5  | 0.90 | 15.8 | 11.5 | 10.7 | 357 | 222 |
| 6  | 0.88 | 14.7 | 11.7 | 10.5 | 384 | 195 |
| 7  | 0.97 | 4.0  | 12.1 | 11.9 | 316 | 271 |
| 8  | 1.00 | 14.9 | 11.1 | 8.1  | 396 | 184 |
| C1 | 1.61 | 17.2 | 11.0 | 7.4  | 417 | 175 |
| C2 | 0.69 | 12.1 | 11.4 | 9.3  | 376 | 216 |

The invention claimed is:

1. A solid catalyst component comprising the product of a process comprising:
   (a) reacting a magnesium alcoholate compound of formula Mg(OR$_1$)(OR$_2$), wherein R$_1$ and R$_2$ are identical or different and are each an alkyl radical having 1 to 10 carbon atoms, with titanium tetrachloride carried out in a hydrocarbon at a temperature of 50-100° C., wherein the reaction of the magnesium alcoholate with TiCl$_4$ is carried out at a molar ratio of Ti/Mg in the range of 1.5 to 4,
   (b) subjecting the reaction mixture obtained in (a) to a heat treatment at a temperature of 100° C. to 200° C. for a time ranging from 3 to 25 hours, and
   (c) isolating and washing with a hydrocarbon the solid obtained in (b), wherein said solid catalyst component has a Cl/Ti molar ratio from 3.5 to 5, wherein said solid catalyst component has a particle size between 5 and 30 µm; and
wherein said catalyst component has the following molar ratio: Mg:Ti:—Cl=1:0.8-1.5:3.2-4.2.

2. The solid catalyst component according to claim 1 wherein the magnesium alcoholate is magnesium diethoxide and is used as a gel dispersion in a hydrocarbon medium.

3. The solid catalyst component according to claim 1 wherein reaction of the magnesium alcoholate with TiCl$_4$ is carried out at a temperature from 60 to 90° C. and for a time of 2 to 6 hours.

4. The solid catalyst component according to claim 3 wherein the molar ratio of Ti/Mg ranges from 1.75 to 2.75.

5. The solid catalyst component according to claim 1 wherein the heat treatment in step (b) is carried out at a temperature ranging from 100° C. to 140° C., for a period of time ranging from 5 to 15 hours.

6. The solid catalyst component according to claim 1 wherein the solid catalyst component is further contacted in a step (d) with an aluminum alkyl halide compound selected from dialkylaluminum monochlorides of the formula R$^3{}_2$AlCl or the alkylaluminum sesquichlorides of the formula R$^3{}_3$Al$_2$Cl$_3$, wherein R$^3$ are identical or different alkyl radicals having 1 to 16 carbon atoms.

7. The solid catalyst component according to claim 6 wherein the aluminum alkylchloride compound is used in amounts such that the Al/Ti molar ratio (calculated with reference to the Ti content of the solid catalyst component as isolated in step (c)) is from 0.05 to 1.

8. The catalyst component according to claim 6 wherein after step (d) the final solid catalyst component has the Cl/Ti molar ratio increased with respect to that of the solid before step (d).

9. A catalyst system for the polymerization of ethylene comprising the product of the reaction between the solid catalyst component according to claim 1 (component A) and an organoaluminum compound (B) selected from trialkyl aluminum compounds.

10. A process for the polymerization of ethylene in suspension carried out in the presence of the catalyst system according to claim 9.

* * * * *

UNITED STATES PATENT AND TRADEMARK OFFICE
CERTIFICATE OF CORRECTION

PATENT NO. : 8,728,970 B2
APPLICATION NO. : 13/387102
DATED : May 20, 2014
INVENTOR(S) : Friedhelm Gundert et al.

Page 1 of 1

It is certified that error appears in the above-identified patent and that said Letters Patent is hereby corrected as shown below:

In the specification
| | | |
|---|---|---|
| Column 3 | Line 6 | Delete "N2" and insert --$N_2$-- |
| Column 4 | Line 10 | After "tri-n-butylaluminum", insert --tri-n-hexylaluminum-- |
| Column 4 | Line 18 | Delete "C2-C10" and insert --$C_2$-$C_{10}$-- |
| Column 5 | Line 15 | Delete "Mg(OC2H5)₂" and insert --$Mg(OC_2H_5)_2$-- |
| Column 5 | Line 19 | Delete "Mg(OC2H5)₂" and insert --$Mg(OC_2H_5)_2$-- |
| Column 5 | Line 53 | Delete "N2" and insert --$N_2$-- |
| Column 5 | Line 54 | Delete "(N2)," and insert --($N_2$),-- |
| Column 6 | Line 65 | Delete "kWh" and insert --kg/h-- |
| Column 8 | Line 38 | Delete "Mg(OC7H5)₂" and insert --$Mg(OC_2H_5)_2$-- |

In the claims
| | | |
|---|---|---|
| Column 9 | Line 29 | In Claim 1, after "wherein", delete "wherein" |

Signed and Sealed this
Twenty-sixth Day of July, 2016

Michelle K. Lee
*Director of the United States Patent and Trademark Office*